United States Patent
Lin et al.

(10) Patent No.: US 9,012,828 B2
(45) Date of Patent: Apr. 21, 2015

(54) METHOD AND DEVICE FOR SENSING A POSITION OF AN OBJECT

(75) Inventors: Hung-Yu Lin, New Taipei (TW); Chun-Jung Wu, Tainan (TW)

(73) Assignee: Cho-Yi Lin, New Taipei (TW)

(*) Notice: Subject to any disclaimer, the term of this patent is extended or adjusted under 35 U.S.C. 154(b) by 380 days.

(21) Appl. No.: 13/465,403

(22) Filed: May 7, 2012

(65) Prior Publication Data
US 2012/0287443 A1 Nov. 15, 2012

(30) Foreign Application Priority Data
May 9, 2011 (TW) .............................. 100116225 A

(51) Int. Cl.
G06M 7/00 (2006.01)
G06F 3/042 (2006.01)
G01B 11/02 (2006.01)

(52) U.S. Cl.
CPC ..................................... *G01B 11/026* (2013.01)

(58) Field of Classification Search
USPC .......................................... 250/221; 345/175
See application file for complete search history.

(56) References Cited

U.S. PATENT DOCUMENTS

| | | | | |
|---|---|---|---|---|
| 4,782,328 | A * | 11/1988 | Denlinger ........................... | 341/5 |
| 5,148,016 | A * | 9/1992 | Murakami et al. ............. | 250/221 |
| 6,362,468 | B1 * | 3/2002 | Murakami et al. ............. | 250/221 |
| 2007/0279352 | A1 | 12/2007 | Tanaka | |
| 2011/0298753 | A1 * | 12/2011 | Chuang et al. ................. | 345/175 |
| 2011/0316813 | A1 * | 12/2011 | Gu et al. ........................ | 345/175 |

FOREIGN PATENT DOCUMENTS

| | | |
|---|---|---|
| CN | 1280670 C | 10/2006 |
| CN | 101681611 A | 3/2010 |
| CN | 101819501 A | 9/2010 |
| CN | 101828128 A | 9/2010 |
| CN | 101847058 A | 9/2010 |
| CN | 101963868 A | 2/2011 |
| EP | 0366112 A2 | 5/1990 |
| WO | 9733182 A1 | 9/1997 |
| WO | 03046820 A2 | 6/2003 |

OTHER PUBLICATIONS

Office Action and Search Report; Taiwanese Patent Application No. 100116225; Mar. 13, 2014; Taiwan Intellectual Property Office; Taipei, Taiwan.
First Office Action; Chinese Patent Application No. 201210139372.3; Oct. 31, 2014; State Intellectual Property Office of the People's Republic of China.
Search Report; Chinese Patent Application No. 201210139372.3; Oct. 21, 2014; State Intellectual Property Office of the People's Republic of China.

* cited by examiner

*Primary Examiner* — Thanh Luu
(74) *Attorney, Agent, or Firm* — Stevens & Showalter, LLP

(57) ABSTRACT

A sensing method and device for sensing the position of an object are provided. The sensing device comprises a light source for generating a plane light, and a sensor unit disposed at one side of the light source. The sensing method comprises driving the light source to generate the plane light, forming a reflective light distribution by the object reflecting the plane light; and estimating a relative distance between the object and the light source according to the reflective light distribution.

31 Claims, 15 Drawing Sheets

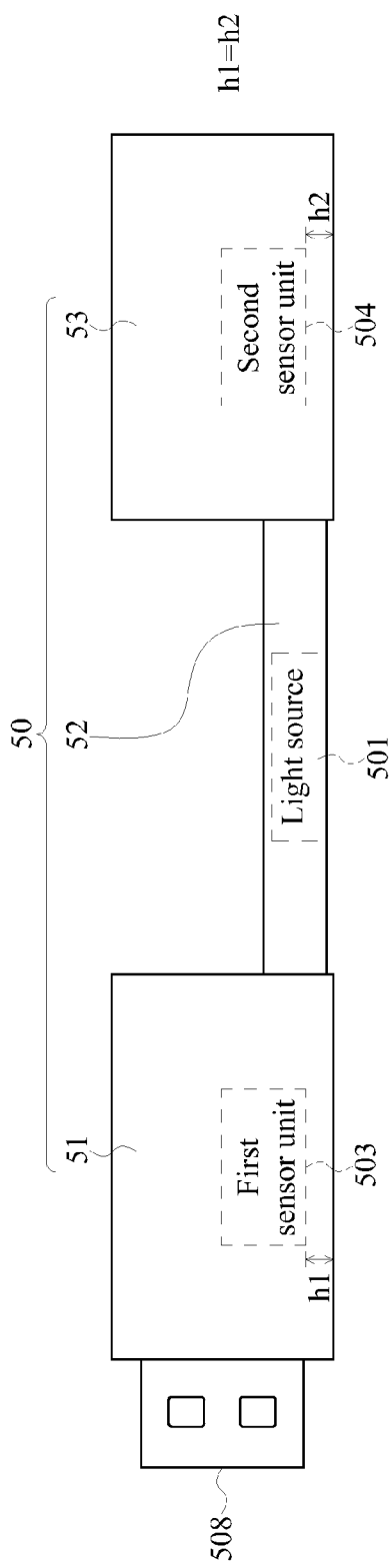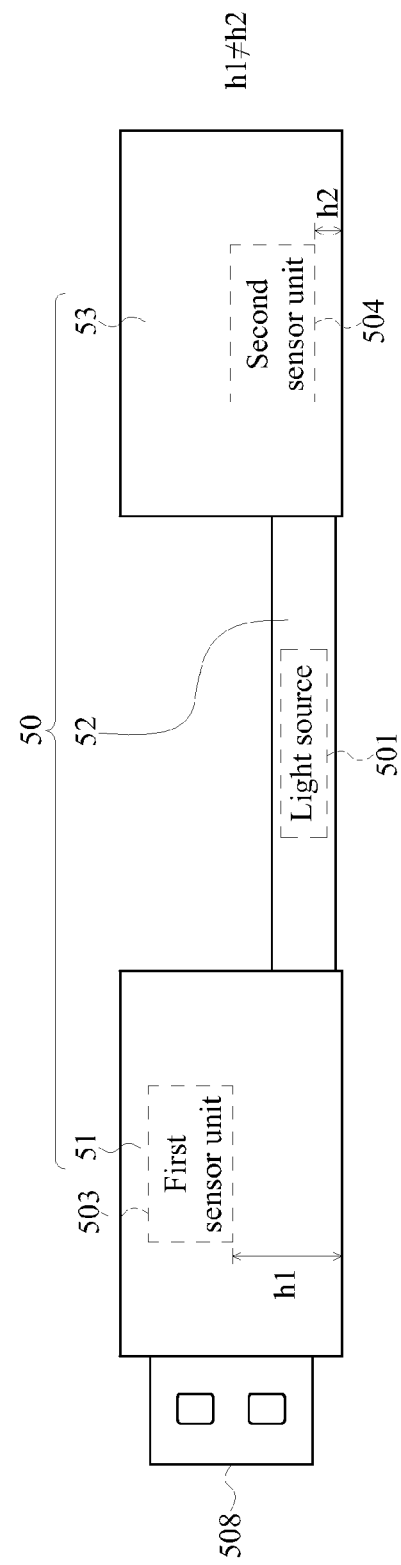

METHOD AND DEVICE FOR SENSING A POSITION OF AN OBJECT

CROSS-REFERENCE TO RELATED APPLICATIONS

This non-provisional application claims priority under 35 U.S.C. §119(a) on Patent Application No(s). 100116225 filed in Taiwan, R.O.C. on May 9, 2011, the entire contents of which are hereby incorporated by reference.

BACKGROUND

1. Technical Field

The disclosure relates to a sensing method and device, and more particularly to a sensing method and device for sensing the position of an object.

2. Related Art

The touch devices can be classified to be resistance touch device, capacitance touch device, optical touch device, and etc according to different working principles. The merits of the optical touch device are comfortable touch feeling, low material cost, and so on.

Optical touch device has light source and sensor unit disposed at the surrounding of the touch panel or at the bottom of the device. The optical touch device operates based on the light interruption principle. That is, when the light emitted from a light source is interrupted, it means that a user is performing a touch operation, and as a result the light cannot go ahead along the original emitting direction. A sensor unit senses the light interruption and transmits a sensed signal corresponding to the light interruption to a processing unit to determine the position of the touch point.

FIG. 1 shows an optical touch device according to the related art. The touch device 10 comprises a base plate 101, a first image sensing module 103 disposed at the upper left corner of the base plate 101, a second image sensing module 104 disposed at the upper right corner of the base plate 101, a processing circuit 106 having signal connections with the first image sensing module 103 and the second image sensing module 104, and a reflection element 102 disposed at the surrounding of the base plate 101. The first and second image sensing modules are used to capture images in the touch area 107. The processing circuit 106 is used to calculate the position of an object 11 in the touch area 107 according to the captured images.

In FIG. 1, infrared ray is emitted from the image sensor modules to the object 11. The object 11 reflects the infrared ray and generates an image for determining the position of the object 11. The image received by the image sensor modules can be divided into two parts. One is the zone with higher brightness which is reflected by the reflection element 102, and the other is the dark zone because of the light interruption by the object 11.

In other words, the touch device 10 according to the related art uses the bright zone and the dark zone to provide the touch area 107, which is the area formed on the base plate 101 by the reflection element 102. In this case, when a user performs a touch operation by using the object 11 (finger or touch pen), the touch area 107 is limited in the area formed by the reflection element 102.

Because the touch device 10 according to the related art uses the bright zone generated by the reflection element 102 as references for determining the position of the object to be detected, the touch device 10 has the following shortcomings.

Firstly, the touch device is not easily to be carried with due to the size of the base plate 101 and the reflection element 102. The usage environment of the touch area is limited by the real size of the base plate 101 and the reflection element 102. Secondly, the cost of the base plate 101 and the reflection element 102 which adds additional cost of the touch device cannot be ignored. That is, the manufacture and usage of a portable electronic device comprising the related art touch device have a great limitation.

Furthermore, according to the above mentioned working principle of the optical touch device 10, reflection element 102 made of retro-reflective material must be used in the optical touch device 10, and therefore the manufacture cost of the optical touch device and the size of the reflection area of the optical touch device 10 according to the related art are limited.

SUMMARY

In one aspect, a method for sensing a position of an object is disclosed. The method comprises driving a light source to generate a plane light, reflecting the plane light by the object to form a reflective light distribution, and estimating a relative distance between the object and the light source according to the reflective light distribution.

In another aspect, a device for sensing a position of an object is disclosed. The device comprises a light source for generating a plane light and a first sensor unit disposed at one side of the light source for estimating a relative distance between the object and the light source according to a reflective light distribution. The reflective light distribution is formed by the object reflecting the plane light.

In yet another aspect, a device for sensing a position of an object is disclosed. The device comprises a light source for generating a plane light and a sensor unit disposed at one side of the light source for estimating a relative distance between the object and the light source according to a reflective light distribution. The reflective light distribution is formed by the object reflecting the plane light.

BRIEF DESCRIPTION OF THE DRAWINGS

The present disclosure will become more fully understood from the detailed description given herein below for illustration only, and thus are not limitative of the present disclosure, and wherein:

FIGS. 5a-5d illustrate that the first and second sensor units in the sensing device are connected with each other by an adjusting unit;

DETAILED DESCRIPTION

Figure 1:
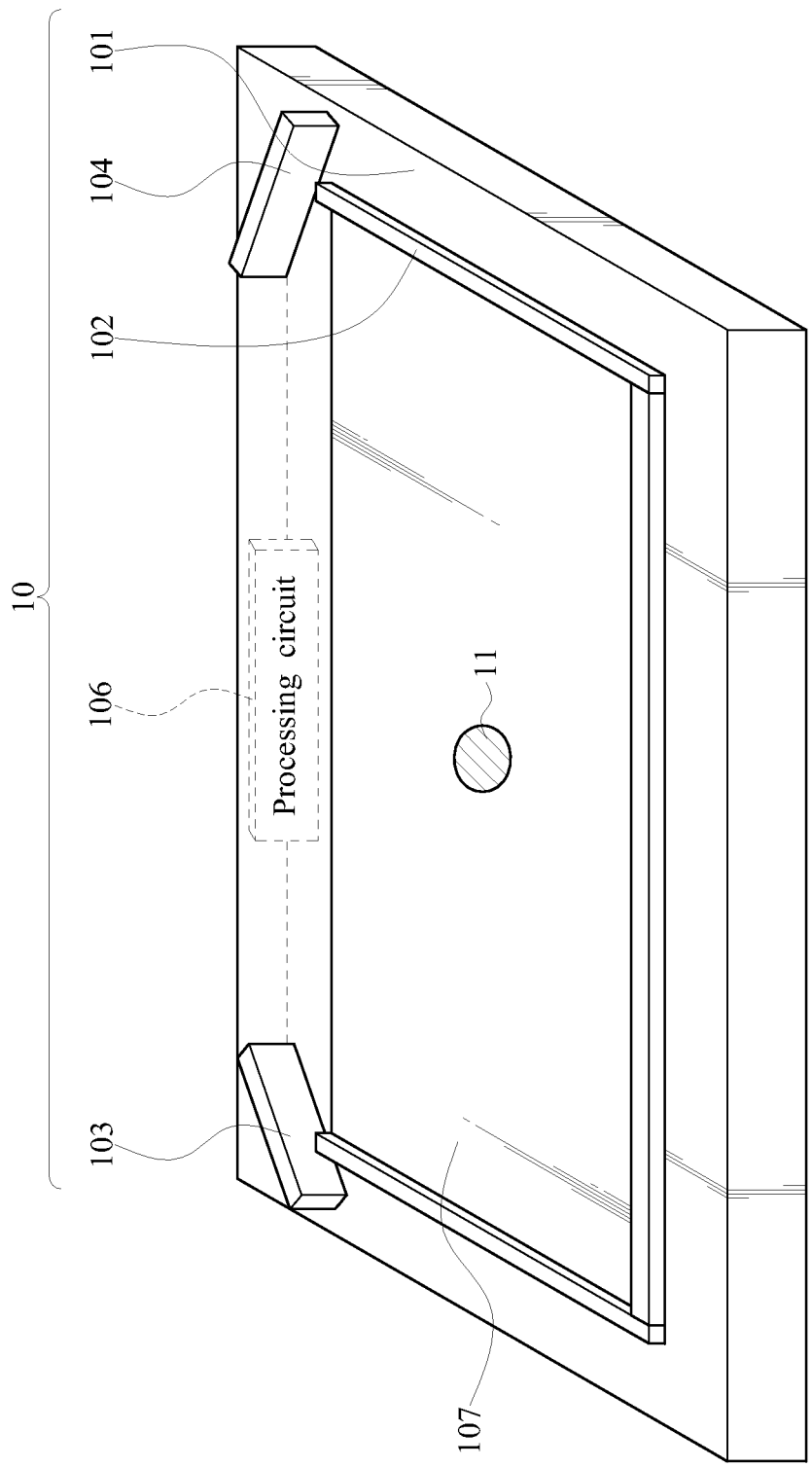
FIG. 1 illustrates an optical touch device according to the related art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

Figure 2A:
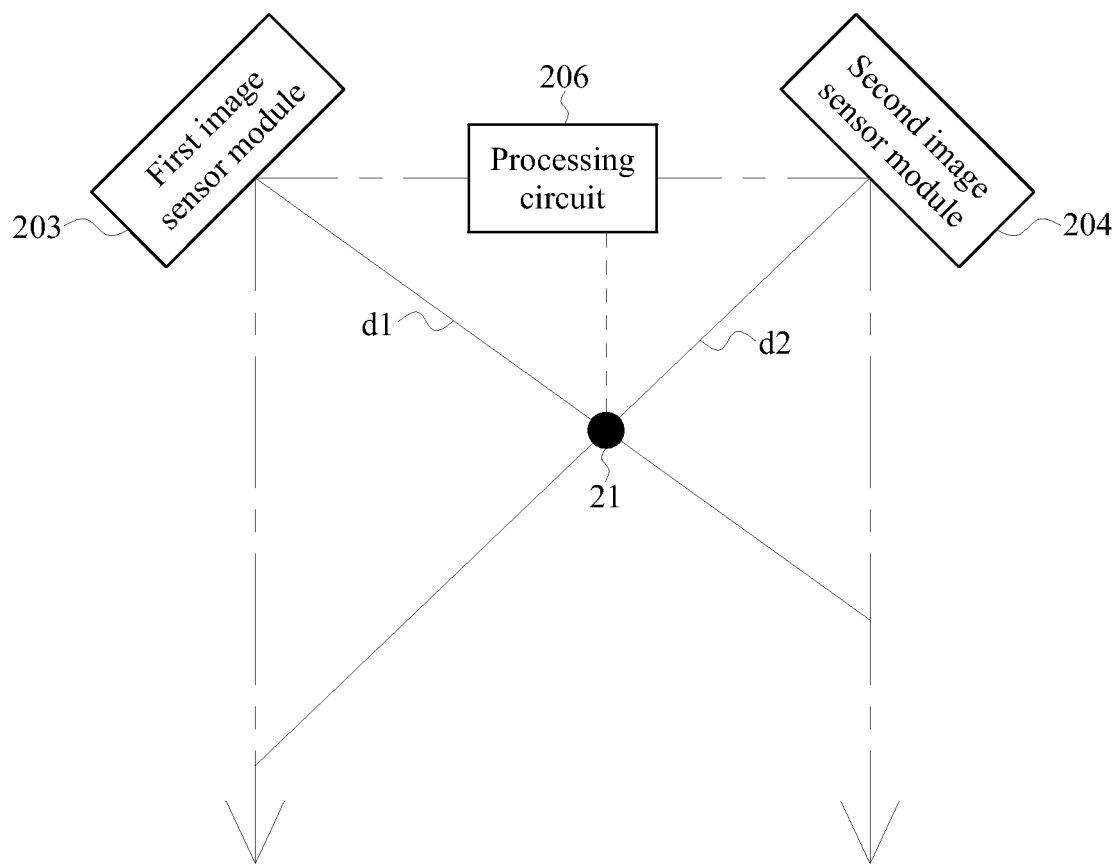
FIG. 2a shows a method for obtaining the image of an object to be detected and determining the position of the object by setting two image sensors at two different positions instead of reflection element and base plate.
Figure 2B:
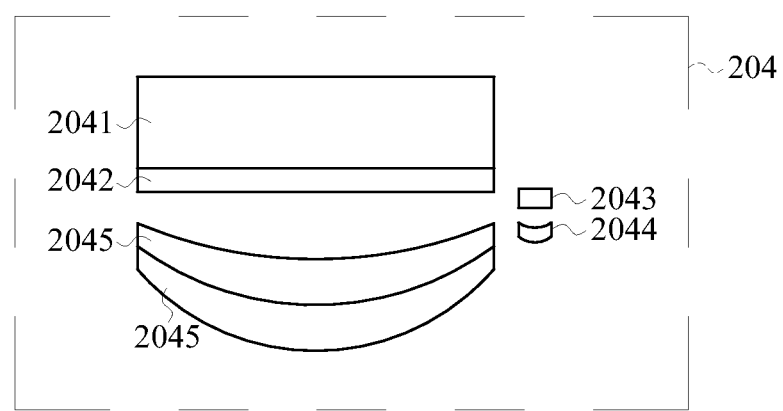
FIG. 2b shows the position and angle of the object to be detected in the image sensed by the image sensor.

In order to overcome the deficiency of using the reflection element 102 in the related art, the inventor provides a method for obtaining touch position variation by using reflective light distribution in the Taiwan patent application NO. 099117670. With reference to FIGS. 2a and 2b, the method will be described as below.

With reference to FIG. 2a, FIG. 2a shows a method for obtaining the image of an object to be detected and determining the position of the object by setting two image sensor modules at two different positions. This method is better than the method of related art in which reflection element and base plate are used.

It seems that both the method of FIG. 2a and the method of related art use the first image sensor module 203, the second image sensor module 204, and the processing circuit 206. However, reflection element and base plate are not needed in the method of FIG. 2 because the internal structure of the first and second sensor units and the image obtaining principle differ from those of the related art.

Simply to say, the method of FIG. 2a uses the reflection image of the object 21 obtained from the reflective light of the object 21 instead of the bright area generated from a reflection element. In this method, characteristic data including the reflective light image is achieved and the position of the object 21 can be calculated according to the characteristic data. The characteristic data may be the object image's area, length-width ratio, boundary, color, brightness, and etc.

As shown in FIG. 2a, the first image sensor module 203 senses the position of the object 21 along the first sensing path d1, and the second image sensor module 204 senses the position of the object 21 along the second sensing path d2. In this situation, if the processing circuit 206 can know the equations regarding the first and second sensing paths d1 and d2 and thus calculate the intersection point of the two paths, the position of the object 21 is obtained.

FIG. 2b shows the internal structure of the second image sensor module 204 in FIG. 2a. As shown in FIG. 2b, the second image sensor module 204 includes the image sensor 2041, the infrared ray filter 2042 (only infrared ray is passed), the infrared ray transmitting unit 2043, optical lens 2044, and optical lens set 2045. The internal structure of the first image sensor module 203 is similar to that of the second image sensor module 204 except that the relative distance between the infrared ray transmitting unit and the optical lens of the first image sensor module 203 and other components of the first image sensor module 203.

In this method, the first and second image sensor modules 203 and 204 obtain the reflective infrared ray image of the object 21. The image data including the reflective infrared ray image obtained by the two sensor modules can be directly transmitted to the processing circuit 206 for processing or pre-processed by the first and second image sensor modules 203 and 204 and then transmitted to the processing circuit 206.

Because the reflective infrared ray of object 21 is directly used in this method, the deficiency of using reflection element in the related art can be overcome. In the other hand, the infrared ray transmitting unit is needed in the method, and thus to cut down the manufacturing cost, the present disclosure provides a method in which the number of infrared ray transmitting unit can be reduced.

Figure 3A:
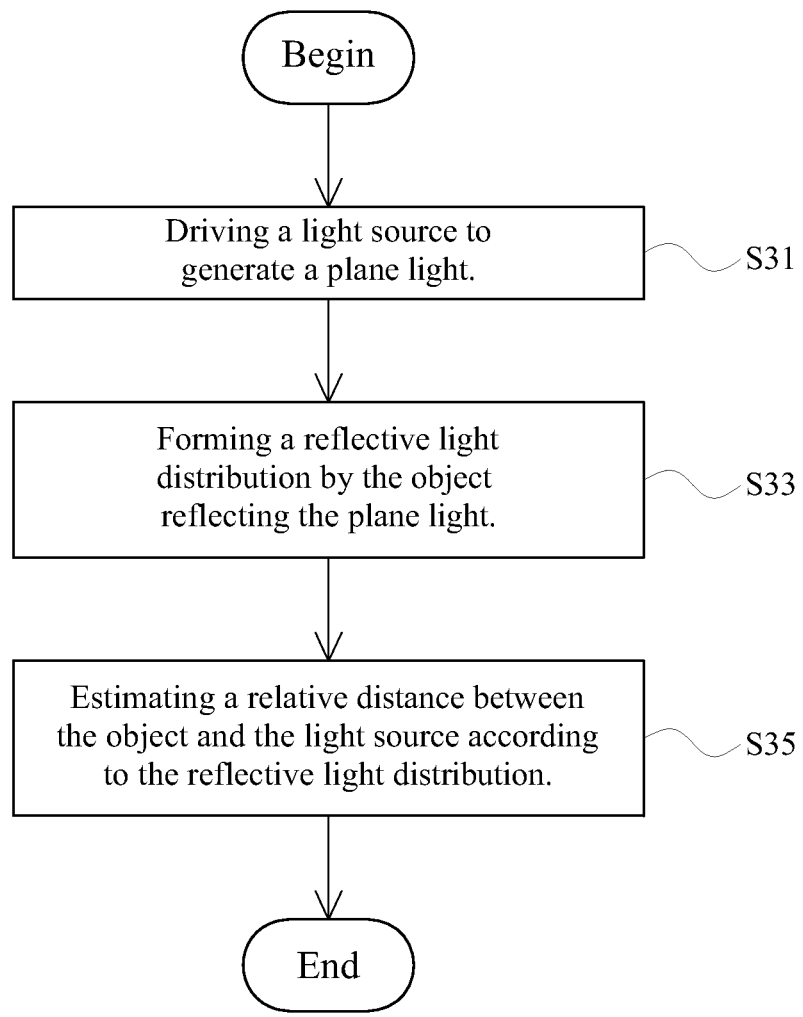
FIG. 3a is a flowchart of a sensing method for estimating the position of the object to be detected according to the reflective light distribution.

FIG. 3a is a flowchart of a method for sensing the position of an object by using reflective light distribution. In particular, the sensing method includes the following steps: driving a light source to generate a plane light (S31); forming a reflective light distribution by the object reflecting the plane light (S33); and estimating a relative distance between the object and the light source according to the reflective light distribution (S35).

One invention concept of the disclosure is to use a single light source matched with image sensor modules to achieve images including reflective light distribution of the object to be detected and thus calculate the position of the object to be detected according to the images. Here, the light source may be a point light source, and laser light, light-emitting diode (LED), and so on can be used as the point light source.

Preferably, a light source which can be sensed by sensor modules but not by eyes can be used in this disclosure. That is, the light source may be Infrared Ray (IR) Laser Diode (LD) or LED which emits light with wave length greater than 780 nm. The wave length is for example 850 nm or 940 nm. In this case, even if the object to be detected has different materials, the reflection brightness will not be influenced. Furthermore, if the object to be detected has a dark color, the reflective light of the object may be a little dark. However, when the light source has a high intensity, the reflective light distribution is not much influenced because of the dark color of the object.

In the step S31, the plane light may be generated by selectively making the emergent ray pass through a diffractive optical element (e.g., cylindrical lens). Alternatively, the plane light may be generated by making the emergent ray pass through a micro-electromechanical (MEM) mirror.

If the emergent ray from the light source passes through a diffractive optical element (e.g., cylindrical lens), the plane light is generated directly. In the other hand, if the emergent ray from the light source passes through the MEM mirror, the movement and rotate speed of the MEM mirror are controlled by the MEM control system so as to convert the light point emitted from the light source to be the plane light.

If a LED is used as the light source, the plane light may have an offset in range of 10°-20°. In an ideal circumstance, the plane light having an offset smaller than 5° is used in the disclosure. Therefore, if the plane light has a bigger offset, additional lens may be used to make the plane light more intensive. If a laser is used as the light source, the plane light is much ideal because the laser has a good intensity and thus additional lens is not needed.

Figure 3B:
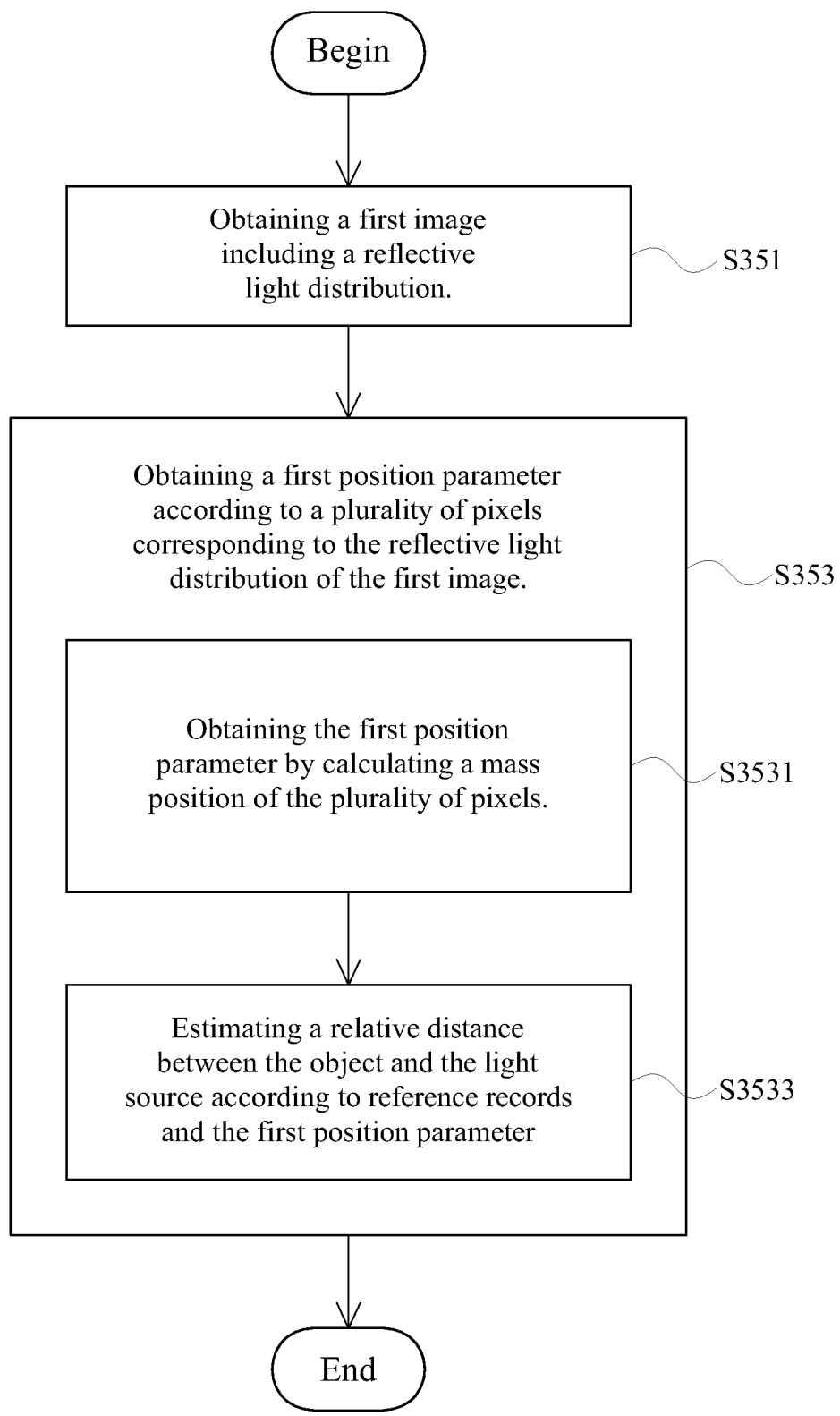
FIG. 3b is a detailed flowchart of the step S31 in which the relative distance between the object and the light source is estimated according to the reflective light distribution.

FIG. 3b is a detailed flowchart of the step S35 in FIG. 3a. The step S35 further comprises the following steps. A first image including the reflective light distribution is obtained by a sensor module (S351). Next, a first position parameter is obtained according to a plurality of pixels corresponding to the reflective light distribution of the first image (S353).

In order to realize the step S353, the sensing device may be achieved by one of a sensor module and a control module, or the combination thereof. In addition, the step S353 may comprise the following steps.

Firstly, the position of center of mass of the plurality of pixels is calculated to obtain the first position parameter (S3531). Then, the relative distance between the light source and the object to be detected is estimated according to the first position parameter and the reference records which are obtained previously (S3533).

More particularly, the first position parameter in the step S3531 may be obtained by the following equation:

$$(X_1, Y_1) = \left( \frac{\sum_{i \in O_1} I_i X_i}{\sum_{i \in O_1} I_i}, \frac{\sum_{i \in O_1} I_i Y_i}{\sum_{i \in O_1} I_i} \right)$$

wherein, (X1, Y1) represents the first parameter. Xi, Yi represents the position of each pixel in the digital image. Ii represents the brightness of each pixel. That is, the first position parameter corresponding to the position of the object is calculated by using the brightness of each pixel as weight. For example, the position of center of mass is obtained from pixels with different brightness, and then the first position parameter is obtained to determine the position of the object to be detected.

In other words, the relative distance between the object to be detected and the light source or the sensor module may be calculated by way of looking up tables or interpolation so long as the center, mass or average value of the reflective light distribution of the object falls in the image. Suppose the resolution of the first image is 640*480 pixels, the calculation result of the position of center of mass may be a decimal. Therefore, the calculated relative distance may have a higher resolution than the resolution provided by the image. For example, the resolution of the relative distance may be that of ½ sub-pixel, ¼ sub-pixel, or ⅛ sub-pixel a pixel.

The reference records used in the step S3533 are information for comparing relative distance formed by a plurality of reference position parameters which are obtained by a setting process.

That is, the setting process is to firstly obtain the reflective light distributions of a reference object when the reference object is in the preset reference positions. Here the present reference positions of the reference object are known. Then, the relation between the object and the actual position (or distance) is obtained based on the position of center of mass calculation. Finally, the actual distance between the object and the light source or sensor module is obtained according to the relation. The relation may be an equation regarding a relative distance d, offset angle θ and the position of center of mass which is obtained by way of looking up tables. Alternatively, the relation may be presented by a chart showing the relative distance d and the offset angle θ.

Different objects in the same position may have the approximately same reflective light distribution. Therefore, pixels including reflective light distribution may have fixed positions in the images sensed by the sensor module. In the setting process, the reference object is moved to positions which are apart from light sources at a plurality of preset distances. Position of center of mass calculation for the plurality of reference reflective light distribution is performed to obtain a plurality of reference position parameters. As a result, the reference records may be stored in the storage unit (for example, a non-volatile memory).

That is, reference records including a plurality of reference position parameters are provided by the setting process. The reference position parameters refer to offset angle θ, focal length f of the lens or other information when moving the reference object to the positions which are apart from the light source at a plurality of preset distances. Since the relative distance between the reference object and the light source d is known, the reference position parameters may be obtained.

Figure 4A:
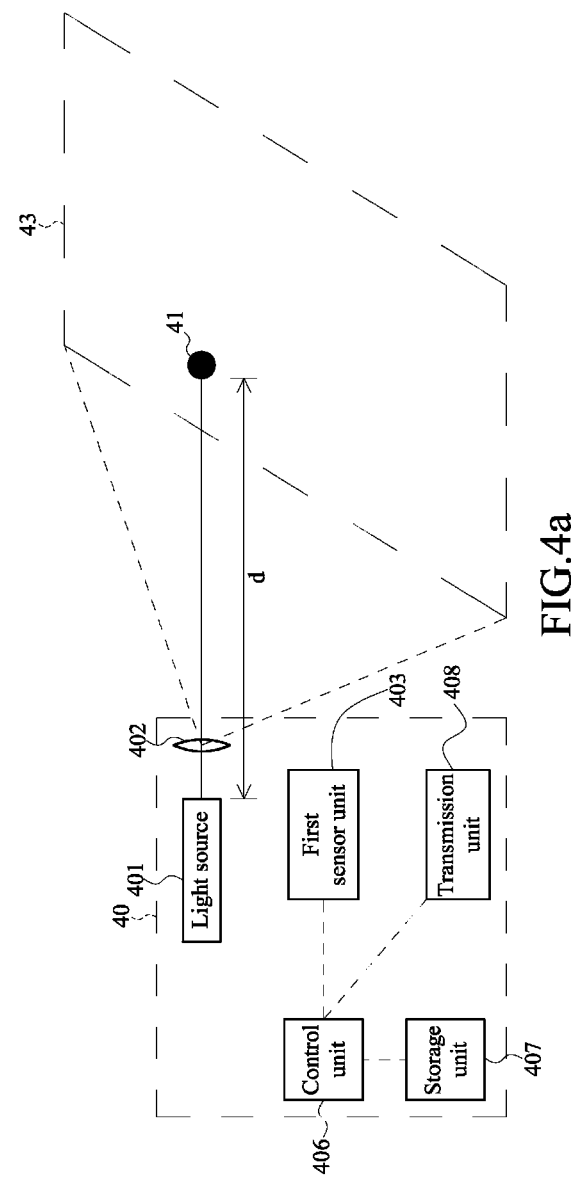
FIG. 4a is a system block diagram of the sensing device for estimating the relative distance between the object to be detected and the light source according to the reflective light distribution.
Figure 4B:
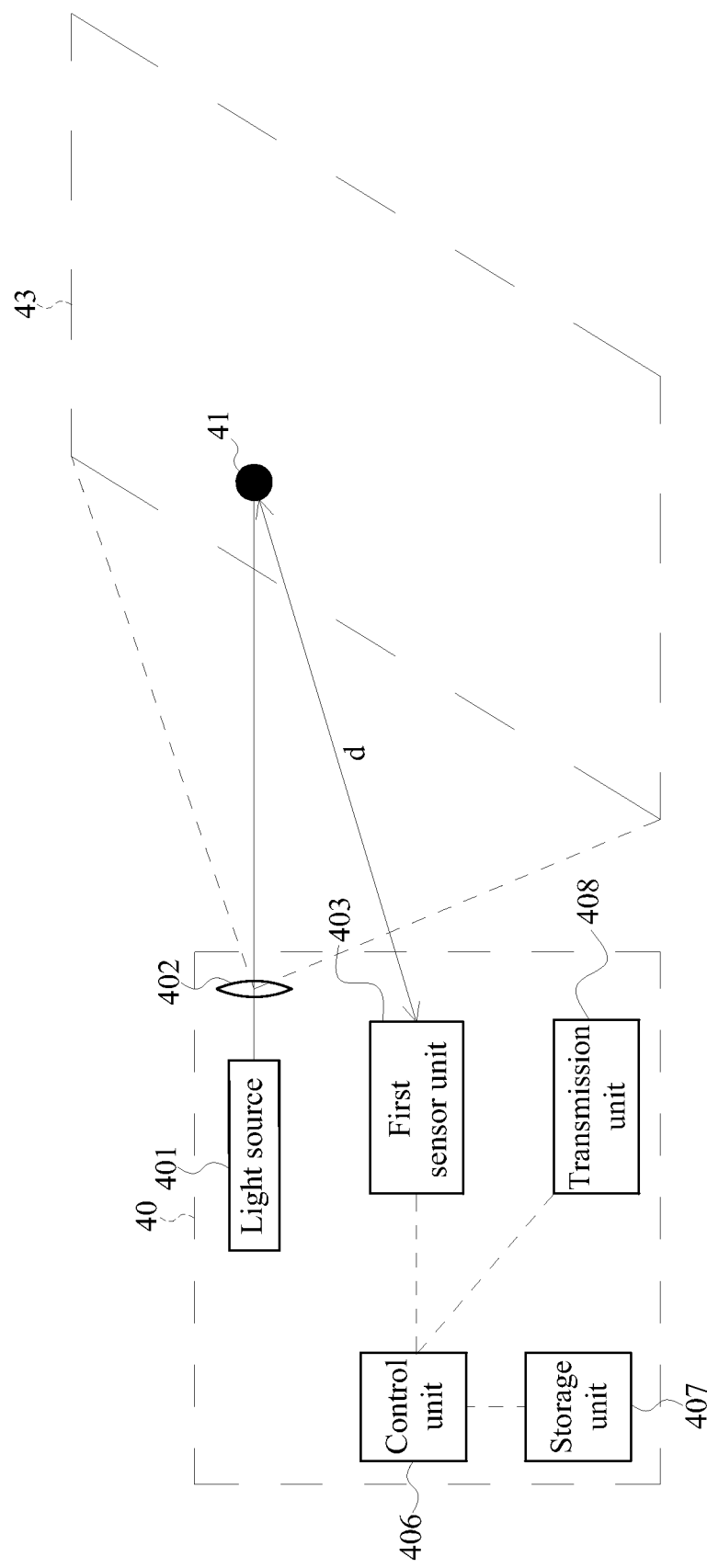
FIG. 4b is a system block diagram of the sensing device for estimating the relative distance between the object to be detected and the first sensor unit according to the reflective light distribution.

FIG. 4a is a system block diagram of a sensing device for estimating the relative distance between the object to be detected and the light source according to the reflective light distribution of the object. FIG. 4b is a system block diagram of a sensing device for estimating the relative distance between the object to be detected and the first sensor unit according to the reflective light distribution of the object.

As shown in FIGS. 4a and 4b, the sensing device 40 comprises the light source 401 and the first sensor unit 403. The first sensor unit 403 is disposed at one side of the light source 401. For example, the first sensor unit 403 may be disposed on the upside, downside, left side, or right side of the light source 401. Preferably, the first sensor unit 403 is disposed above the light source 401. The difference between FIG. 4a and FIG. 4b is that the former is used to estimate the relative distance between the object 41 and the light source 401 and the latter is used to estimate the relative distance between the object 41 and the first sensor unit 403.

Light emitted from the light source 401 passes through the lens 402 to generate the plane light. The first sensor unit 403 is realized by CMOS Image Sensor (CIS) or Charge Coupled Device Sensor (CCD Sensor). The first sensor unit 403 estimates the relative distance d between the object 41 and the light source 401 according to the reflective light distribution of the object 41. The reflective light distribution is formed by the object 41 reflecting the plane light 43.

It should be noted that the plane light generated by the light source 401 is not limited to at a horizontal plane. If the plane of the plane light is parallel with the horizontal plane, the touch area may be infinity under an ideal circumstance. If the plane light intersects the horizontal plane to from a tangent line, the touch area may be considered in the plane light area, i.e., the area formed between the lens 402 and the tangent line.

Actually, in FIGS. 4a and 4b, the first sensor unit 403 and the light source 401 are only needed to be disposed at a same side of the object 41. Therefore, the first sensor unit 403 can be disposed at the upside, downside, left side, or right side of the light source 401. In the present disclosure, the horizontal direction of the sensed image provides information about angle (θ), and the vertical direction provides information of distance (R). Therefore, preferably, the first sensor unit 403 is disposed at the upside or downside of the light source 401.

However, if the information of distance (R) is not needed, the first sensor unit 403 may be disposed at the left side or right side of the light source 401.

Based on the above, preferably the light source 401 is disposed at the lower portion of the sensing device 40, and the first sensor unit 403 is disposed above the light source 401. In this case, the uniformity of light emitted from the light source is easily controlled, and the angle and distance of the object 41 can be easily used for positioning and cursor control.

Also with reference to FIGS. 4*a* and 4*b*, the sensing device 40 may further comprise the control unit 406, the storage unit 407, and the transmission unit 408, each having signal connections with others.

The control unit 406 has a signal connection with the first sensor unit 403. After the first sensor unit 403 senses the first image including the reflective light distribution, the control unit 406 may obtain the first position parameter corresponding to the position of the object according to a plurality of pixels corresponding to the reflective light distribution of the first image, because the first image includes light points of higher brightness which are reflected by the object to be detected.

The storage unit 407 has a signal connection with the control unit 406 so that the reference records are provided to the control unit 406. The control unit 406 calculates the position of center of mass of the plurality of pixels corresponding to the reflective light distribution of the first image, and then estimates the relative distance between the object to be detected and the light source according to the reference records and the first position parameter.

The transmission unit 408 is electrically connected to the first sensor unit 403. The transmission unit 408 is used to transmit the sensed image to a host which has a signal connection with the sensing device and to convert the relative distance between the object and the light source to be cursor display. The host may be computer, mobile phone, personal digital assistant (PDA), and different types of portable electronic devices.

Figure 4C:
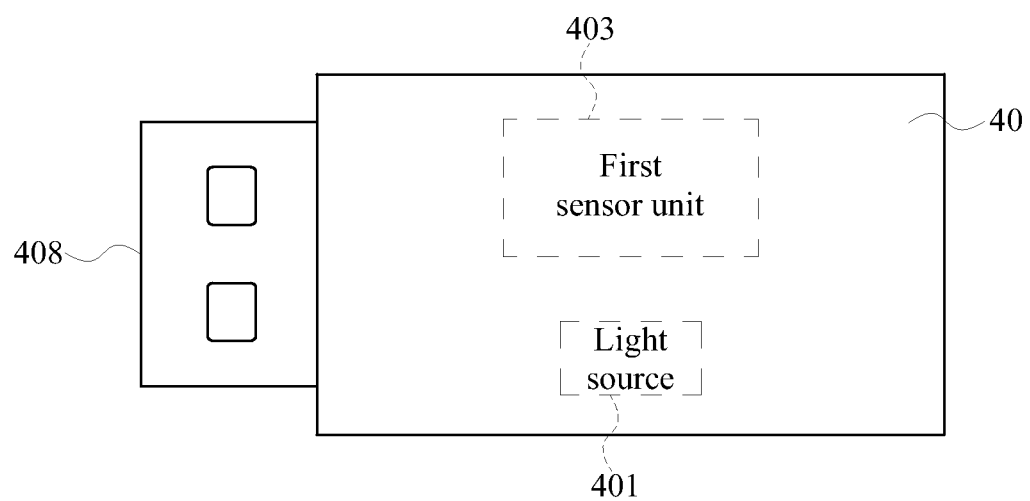
FIG. 4c illustrates a Universal Serial Bus (USB) using the sensing device according to the present disclosure.

FIG. 4*c* shows a Universal Serial Bus (USB) using the sensing device according to the present disclosure. Based on the explanations of FIGS. 4*a* and 4*b*, it is known that the light source 401 and the first sensor unit 403 can be set in a sensing device. In addition, the sensing device and the USB 408 can be formed a plug-and-play device.

Furthermore, the sensing device of the disclosure may further comprise a second sensor unit. The operation of the second sensor unit is the same as that of the first sensor unit. That is, the second sensor unit has a signal connection to the control unit. The second sensor unit estimates the relative distance between the object to be detected and the light source according to the reflective light distribution of the object.

FIGS. 5*a*-5*d* illustrate a sensing device comprising the first sensor unit 503, the second sensor unit 504, and the adjusting unit 52 connecting the first and second sensor units 503 and 504. In this embodiment, the first and second sensor units are disposed at each side of the light source. The first image including the reflective light distribution is obtained by the first sensor unit, and the second image including the reflective light distribution is obtained by the second sensor unit. Then, the second position parameter is obtained according to a plurality of pixels corresponding to the reflective light distribution in the second image.

The adjusting unit 52 is disposed between the two sensor units. The adjusting unit 52 is used to dramatically adjust the horizontal distance between the first sensor unit 503 and the second sensor unit 504.

The first and second sensor units 503 and 504 are disposed at each side of the light source 501. In vertical direction, the distance between the first sensor unit 503 and the horizontal plane of the emergent ray can be or not equal to the distance between the second sensor unit 504 and the horizontal plane of the emergent ray. For simple illustration, as shown in FIGS. 5*a* and 5*b*, suppose the horizontal plane of the plane light is the horizontal plane of the bottom surface of the sensing device 50.

Figure 5C:
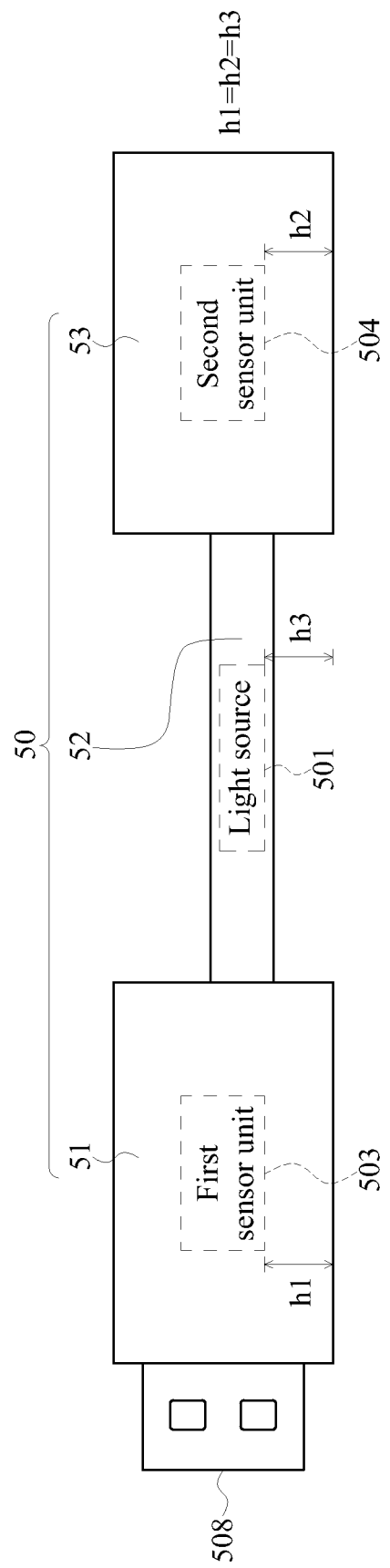

In FIG. 5*a*, suppose that the distance h1 between the first sensor unit 503 and the horizontal plane of the emergent ray is equal to the distance h2 between the second sensor unit 504 and the horizontal plane of the emergent ray. In FIG. 5*b*, suppose that the distance h1 between the first sensor unit 503 and the horizontal plane of the emergent ray is not equal to the distance h2 between the second sensor unit 504 and the horizontal plane of the emergent ray. In FIG. 5*c*, the distance h3 between the light source and the bottom surface of the sensing device can be adjusted to be equal to the distance h1 and h2, where h1 is equal to h2.

Figure 5D:
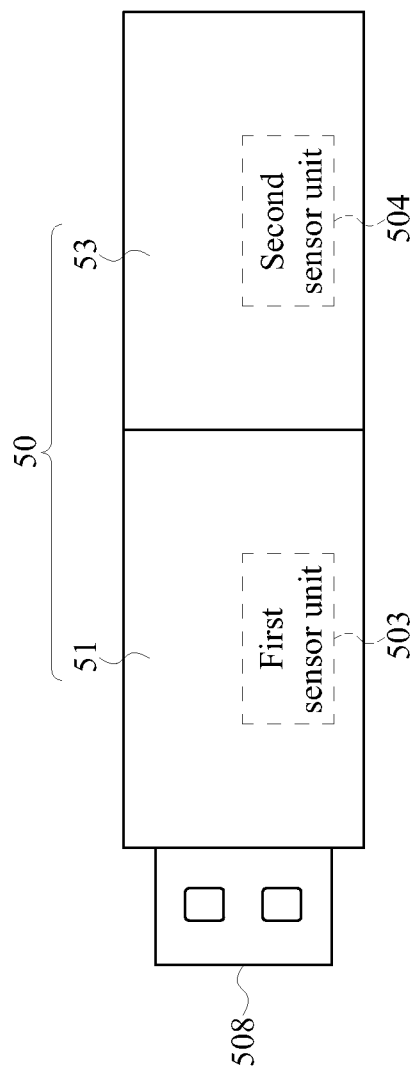

Regardless the relations between the distance h1, h2, and h3, the length of the adjusting unit 52 can be dramatically adjusted. That is, the horizontal distance between the two sensor units 503 and 504 can be adjusted. When the length of the adjusting unit 52 reaches the minimum value, the sensing device 50 is shown in FIG. 5*d*.

Based on the above, it can be concluded the following preferable embodiments.

The first preferable embodiment is shown as FIG. 4*c*. In this first embodiment, a sensor unit is used with a light source. Position of a touch point or positions of multiple touch points can be sensed by using the relative distance d and the offset angle θ.

The second preferable embodiment is shown as FIG. 5*a*. In this second embodiment, the first sensor unit and the second sensor unit have the same distance to the bottom surface of the sensing device. In this case, only the offset angle θ can be obtained, but the relative distance d cannot be obtained.

The third preferable embodiment is shown as FIG. 5*b*. In this third embodiment, the first sensor unit and the second sensor unit have different distances to the bottom surface of the sensing device. In this case, both the offset angle θ the relative distance d can be obtained. Therefore, a virtual operation range can be defined on any plane. Furthermore, in this embodiment, the horizontal distance between the two sensor units can be adjusted, and thus embodiment can be used in a wider field.

Whether the height of the first sensor unit is equal to that of the second sensor unit, or only a single sensor unit is used (as shown in FIG. 4*c*), the position relations between the light source and a sensor unit can be shown as the above mentioned figures. In other words, in the preferable embodiments as above, the position relations between the light source and a sensor unit is provided for illustration but not as a limitation to the disclosure. Other possible position relations are not described herein again.

The disclosure may estimate the relative distance between the object to be detected and the light source according to the reflective light distribution at a time point. Furthermore, the disclosure may sense the position of the object at two different time points. That is, the movement of the object can be determined. Therefore, the disclosure can be used in the situation of continuous touch.

When determining the reflective light distribution, even if the object is in a stereoscopic operation plane instead of a real touch plane, the sensor unit can also sense the reflective light distribution. Therefore, in the disclosure, the object can move on a real touch plane or on a virtual plane in a stereoscopic room. In other words, the area which can be sensed by a sensor unit is defined as a sensing area. If the object to be detected performs movement on the sensing area, variation of the reflective light distribution is generated so that the position of the object can be determined.

To determine the touch positions at continuous time points, the method for determining the positions of the object comprises the following steps. Firstly, a first relative distance between the object and the light source at the first time point is obtained. Secondly, a second relative distance between the object and the light source at the second time point is obtained. Thirdly, the movement of the object between the first time point and the second time point is determined according to the first relative distance and the second relative distance.

Generally, the reference records may be stored and obtained by a setting process before leaving factory because the setting process is time consuming. Alternatively, the setting process can be initiated after the sensing device leaves factory. In this case, new reference records can be dramatically sensed after a time that users begin to use the sensing device, in order to avoid the offset of the sensing device which is effected by crash or other factors. Furthermore, the setting process can be initiated before the use of the sensing device. Although this method is time consuming, the setting process may be flexible. That is, users can select the touch area that they would like and then perform the setting process after adjusting the horizontal distance between the first sensor unit and the second sensor unit.

Even if the reference records are stored before leaving factory, the setting process can be also provided for correction. The setting process is used to assistant the position determination during sensing flow. Therefore, that when and how to perform the setting process is not emphasized by the disclosure. The setting process is not discussed herein again.

Figure 6A:
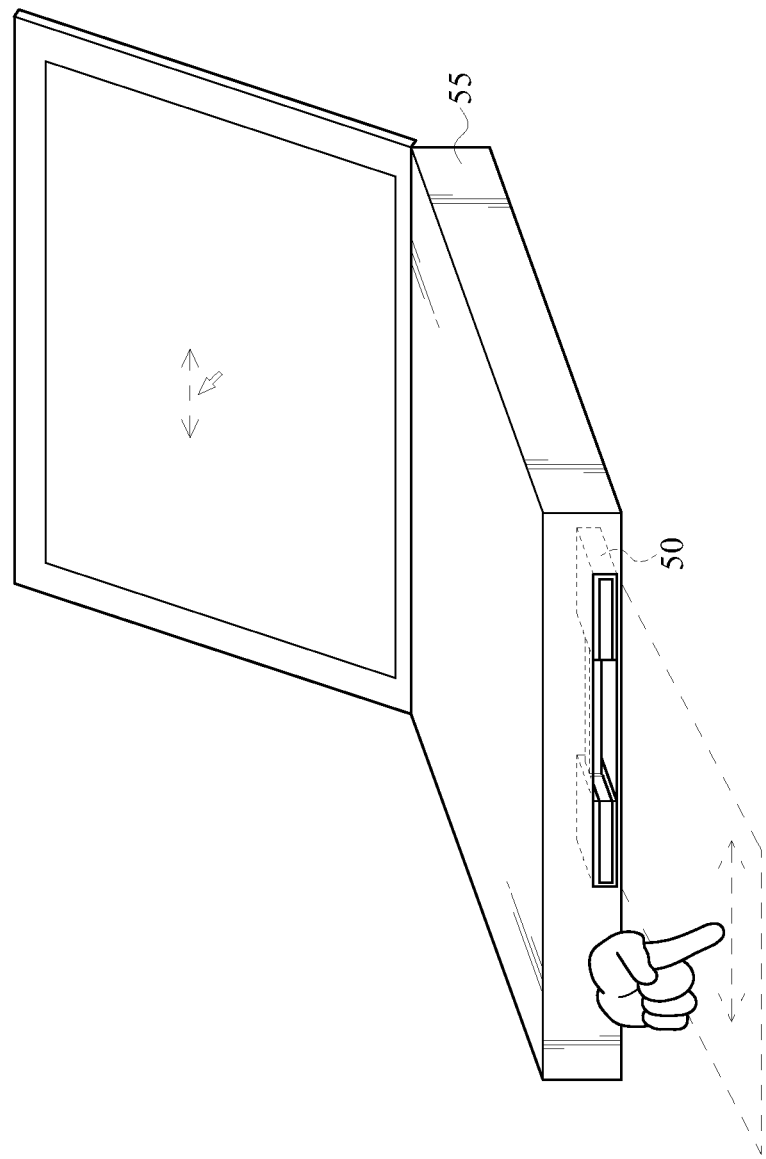
FIGS. 6a-6c illustrate the conversion from touch position operation to the cursor operation when the sensing device performs data exchange with the host by different transmission interfaces.
Figure 6B:
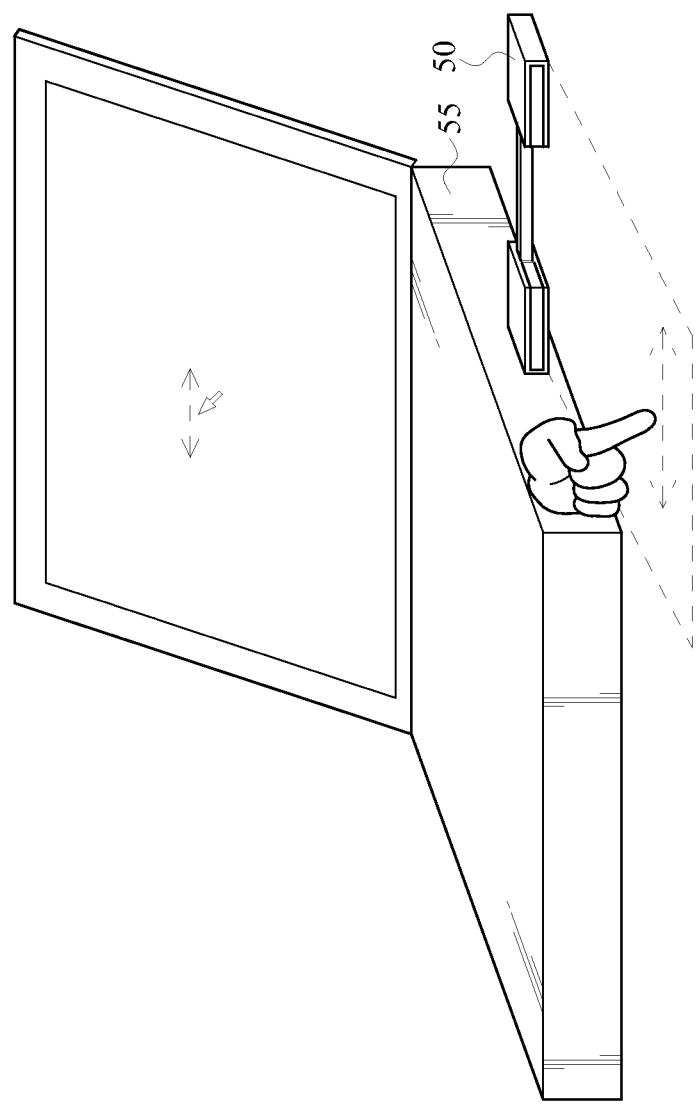
Figure 6C:
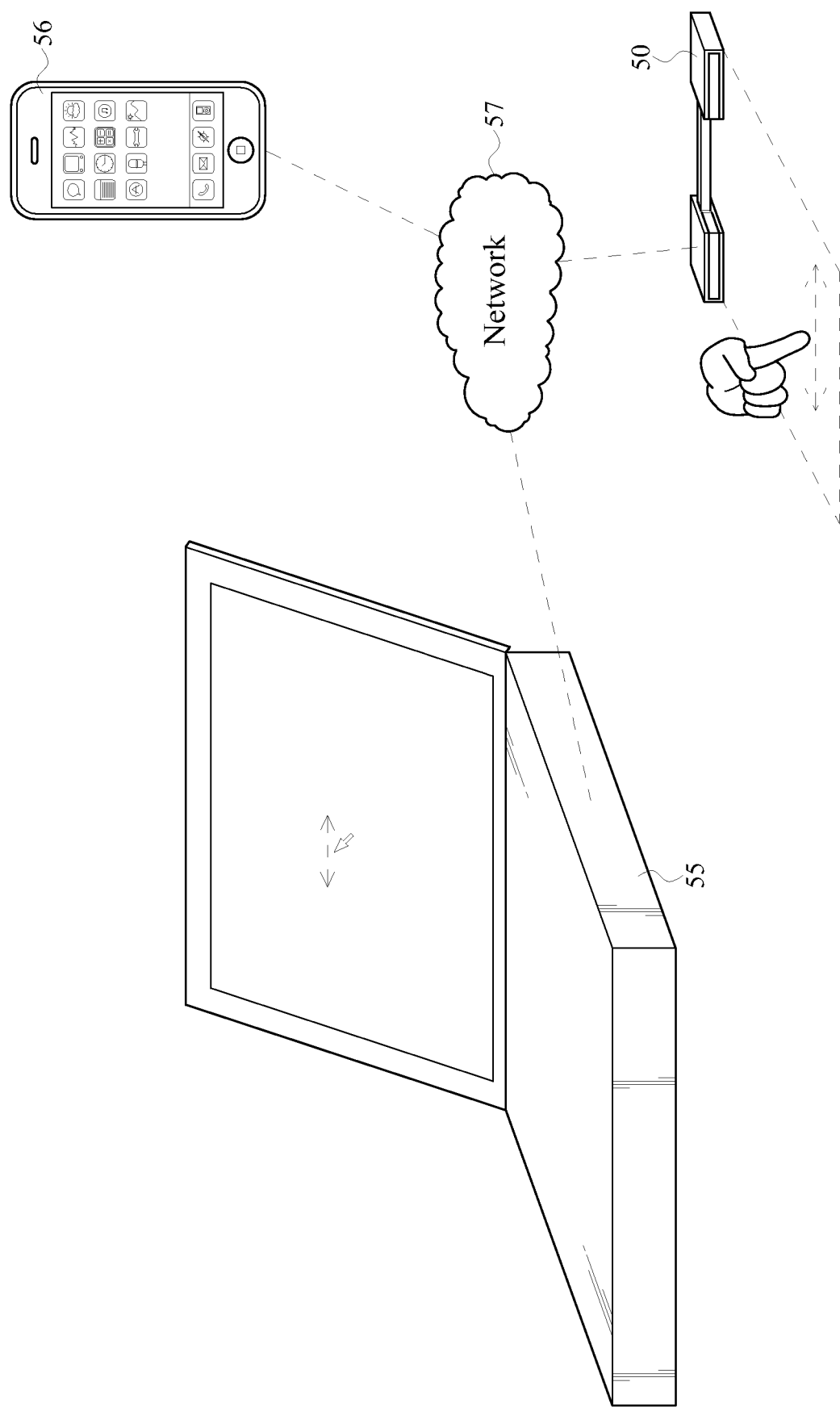

FIGS. 6a-6c show conversions from the touch operation to cursor operation where different transmission interfaces are used to transmit information to the host. For easy explanation, the host is a laptop. However, in actual applications, the host may be a mobile electronic device, a stationary electronic device, or other devices providing touch operations.

In FIG. 6a, the sensing device 50 is mounted in the laptop 55. That is, the sensing device 50 is disposed in the front of the keyboard of the laptop 55. The sensing area formed between the sensor units forms a touch area having touch control function. In FIG. 6b, the sensing device 50 is connected to the laptop 55 by a real port such as dongle. The distance between a first component comprising the first sensor unit 503 and a second component comprising the second sensor unit 504 is adjusted by a connection component. Therefore, the size of the touch area is flexible.

In FIGS. 6a and 6b, the sensing device 50 is electrically connected to the laptop 55 by a real port. Furthermore, the sensing device 50 can be connected to the host such as the laptop 55 or the mobile phone 56 by a wired or wireless network 57, as shown in FIG. 6c. Based on the data transmission between the sensing device and the host, the sensed result can be seen on the screen of the host by for example cursor display.

The present disclosure overcomes the deficiency of the related art which uses a reflection element to define a touch area. In this disclosure, touch operation may be performed on a virtual plane as touch area in an open room.

It should be noted that, for easy illustration, the above embodiments are explained under the situation that only one touch point is used at a time point. Actually, the embodiments can be implemented when more than one touch points are used at different time points.

For dynamical touch operation, the relative distance between the touch point (i.e., object to be detected) and the light source/sensor unit and positions thereof are obtained at a plurality of time points. Based on the relative distance and positions, the movement of the object to be detected is obtained. Furthermore, the movement of the object can be converted to cursor operation. That is, the first relative distance between the object and the first sensor unit and positions thereof are obtained at the first time point by using the first sensor unit, and the second relative distance between the object and the second sensor unit and positions thereof are obtained at the second time point by using the second sensor unit. Then, the movement of the object from the first time point to the second time point can be obtained according to the first relative distance and positions and the second relative distance and positions.

Figure 7A:
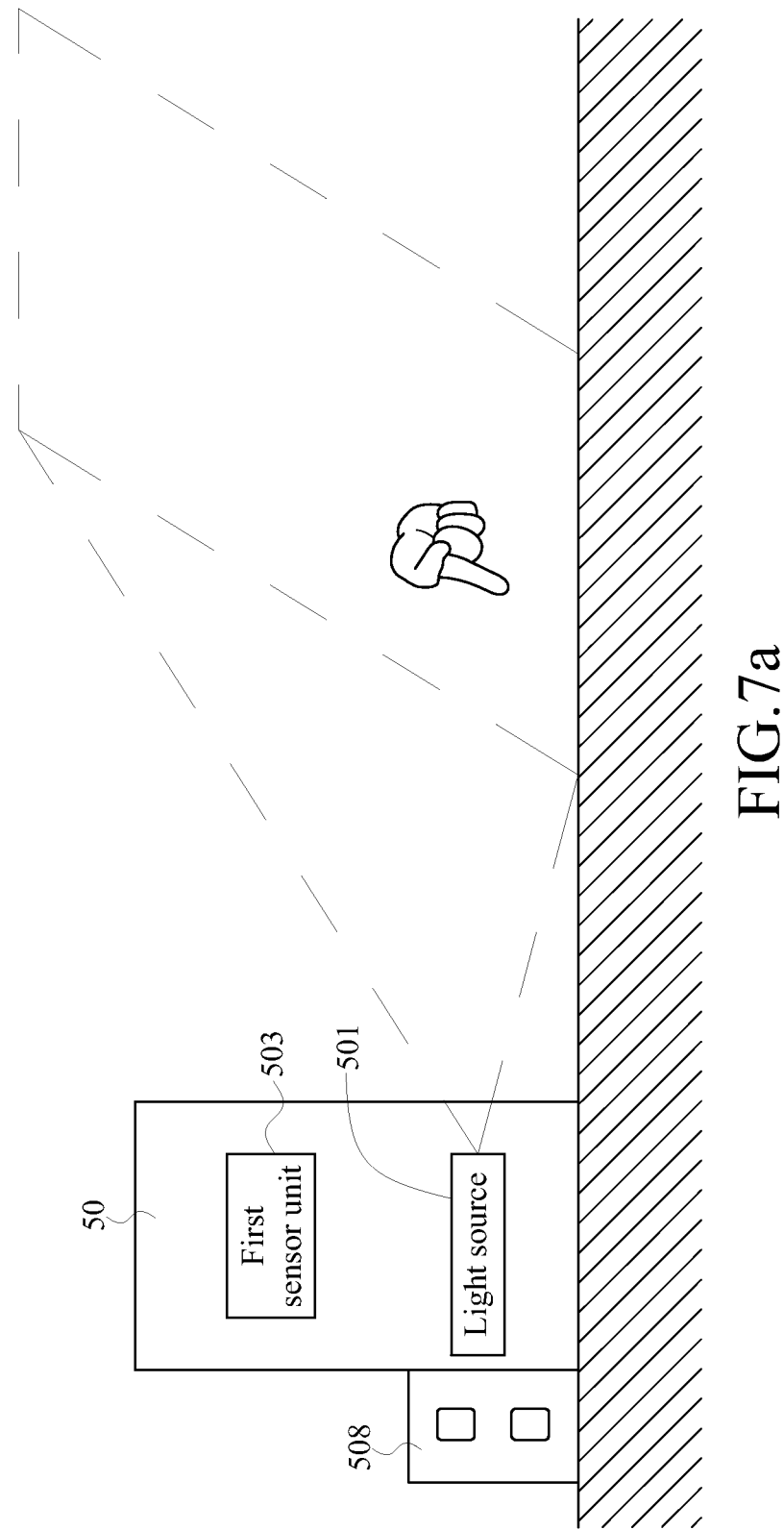
FIG. 7a shows the position variation of the object to be detected on the real touch plane when the plane light of the light source is in the real touch plane.
Figure 7B:
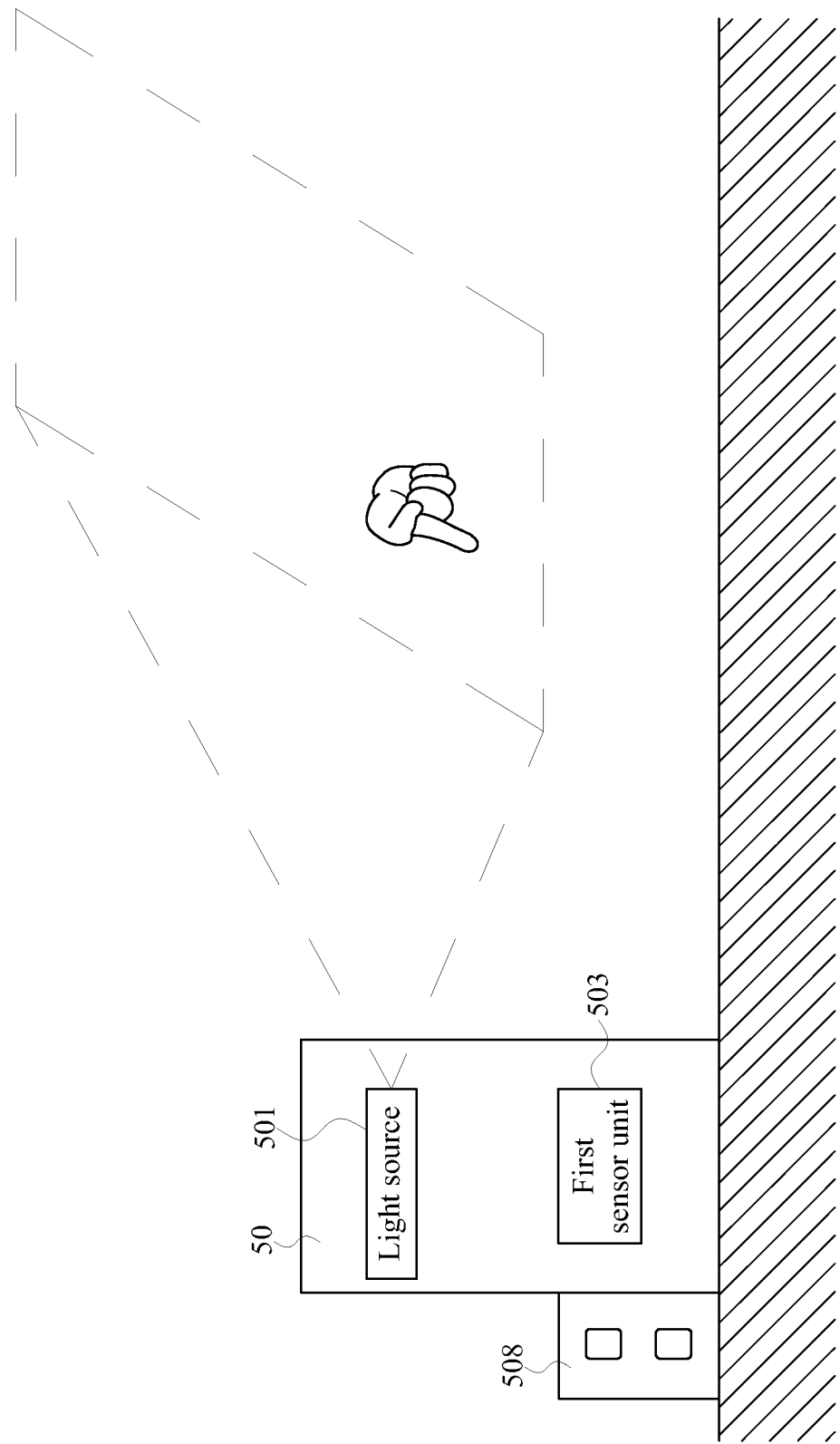
FIG. 7b shows the position variation of the object to be detected on a stereoscopic operation plane when the plane light is on a stereoscopic operation plane.

It should be noted that the positions of the object to be detected at different time points are not limited to a particular touch plane. The reflective light distribution can be also obtained even if the position of the object is not on a real touch plane. Actually, the position of the object can be moved and changed in the sensing area defined by the plane light. FIGS. 7a and 7b illustrate the possible positions of the object to be detected.

FIG. 7a shows the position variation of the object on the real touch plane when the plane light of the light source is in the real touch plane. In FIG. 7a, the plane where the object performs the touch operation is the same as the plane where the sensing device 50 is positioned. That is, the object to be detected is touched with a real touch plane. The first sensor unit 503 receives the reflective light distribution of the object. The reflective light distribution will be used to judge the position variation of the object.

FIG. 7b shows the position variation of the object to be detected on a stereoscopic operation plane when the plane light is on a stereoscopic operation plane. In FIG. 7b, the plane where the object operates is higher than the plane where the sensing device 50 is positioned. That is, the object does not operate on a real touch plane touching the object but on a virtual plane in a stereoscopic room. The first sensor unit 503 receives the reflective light distribution of the object. The reflective light distribution will be used to judge the relative position relation between the object and the light source 501 (or the first sensor unit 503).

Based on the above, the sensing method and device of the disclosure greatly improve the usage convenience of the sensing device and enlarge the touch area. It should be noted that, in the above preferable embodiments, the storage unit stores previously the reference records obtained by the setting process and the reference records may be used by the position of center of mass calculation. However, in the actual applications, the setting process may be determined before leaving factory or be dramatically determined before operations. In other words, the reference records can be obtained flexibly according to environment (e.g., the distance between the first sensor unit and the second sensor unit can be adjusted).

Persons skilled in the art would appreciate that various logic blocks, modules, circuits, and method steps in the above embodiments may be implemented by electronic hardware, computer software, and the combination there of. The connections in the implementation process, such as linking, coupling, electrical connection, or others are used to illustrate that when implementing the logic blocks, module, circuits, or method steps, different manners such as wired electronic signal, wireless electromagnet signal, and light signal can be used for direct or indirect transmission and switching of signal, data, or control information. Therefore, terms in the disclosure are not understood as limitation for implementing the connections. Other connections which are not described in the disclosure are also within the scope of the disclosure.

Note that the specifications relating to the above embodiments should be construed as exemplary rather than as limitative of the present invention, with many variations and modifications being readily attainable by a person skilled in the art without departing from the spirit or scope thereof as defined by the appended claims and their legal equivalents.

What is claimed is:

1. A method for sensing a position of an object, comprising:
   driving a light source to generate a plane light;
   reflecting the plane light by the object to form a reflective light distribution; and
   estimating a relative distance between the object and the light source according to the reflective light distribution, wherein the step of estimating the relative distance between the object and the light source according to the reflective light distribution comprises:
      obtaining a first image including the reflective light distribution; and
      obtaining a first position parameter according to a plurality of pixels corresponding to the reflective light distribution of the first image, wherein the step of obtaining the first position parameter comprises:
         performing a calculation for a position of center of mass of the plurality of pixels corresponding to the reflective light distribution of the first image to obtain the first position parameter; and
         estimating the relative distance between the object and the light source according to a reference record and the first position parameter,
         wherein the step of performing the calculation for the position of center of mass of the plurality of pixels comprises performing a calculation for the position of center of mass by using brightness of each pixel of the plurality of pixel as weight of each pixel, the number of the plurality of pixels, and positions of the plurality of pixels on the first image.

2. The method according to claim 1, wherein the light source is a laser diode or a light-emitting diode (LED).

3. The method according to claim 1, wherein the light source emits an emergent ray, and the step of driving the light source to generate the plane light comprises:
   the emergent ray generating the plane light by passing through a cylindrical lens; or
   the emergent ray generating the plane light by passing through a rotatable micro-electromechanical (MEM) mirror.

4. The method according to claim 1, wherein the reference records comprise a plurality of reference position parameters, and the reference position parameters are obtained by a setting process in which the object is disposed apart from the light source at a plurality of preset relative distances and the position of center of mass is calculated for each of a plurality of reference reflective light distribution formed by reflecting the plane light.

5. The method according to claim 1, further comprising:
   obtaining a second image including a reflective light distribution; and
   obtaining a second position parameter according to a plurality of pixels corresponding to the reflective light distribution of the second image.

6. The method according to claim 5, wherein the first image and the second image are obtained respectively by a first sensor unit and a second sensor unit, and the first sensor unit and the second sensor unit are respectively disposed at each side of the light source.

7. The method according to claim 6, wherein the light source is adapted to generate a emergent ray used for forming the plane light, and distance on a vertical direction between the first sensor unit and a horizontal plane of the emergent ray is different from distance on the vertical direction between the second sensor unit and the horizontal plane of the emergent ray.

8. The method according to claim 1, wherein the step of estimating the relative distance between the object and the light source according to the reflective light distribution comprises:
   obtaining a first relative distance between the object and the light source at a first time point;
   obtaining a second relative distance between the object and the light source at a second time point; and
   obtaining movement of the object between the first time point and the second time point according to the first relative distance and the second relative distance.

9. The method according to claim 1, wherein the plane light defines a sensing area on a real touch plane or on a stereoscopic operation plane.

10. A device for sensing a position of an object, comprising:
    a light source for generating a plane light;
    a first sensor unit disposed at one side of the light source for estimating a relative distance between the object and the light source according to a reflective light distribution, wherein the reflective light distribution is formed by the object reflecting the plane light;
    a control unit having a signal connection with the first sensor unit, the first sensor unit sensing a first image including the reflective light distribution, and a first position parameter being obtained according to a plurality of pixels corresponding to the reflective light distribution of the first image; and
    a storage unit having a signal connection with the control unit, a reference record being provided to the control unit, wherein the control unit performs a calculation for a position of center of mass of the plurality of pixels and obtains the first position parameter, and estimates the relative distance between the object and the light source according to the reference record and the first position parameter;
    wherein the calculation for the position of center of mass comprises using brightness of each pixel as weight of each pixel, the number of the plurality of pixels, and positions of the plurality of pixels on the first image.

11. The device according to claim 10, wherein the light source is a laser diode or a light-emitting diode.

12. The device according to claim 10, wherein the light source emits an emergent ray, and the emergent ray generates the plane light by passing through a cylindrical lens or a rotatable micro-electromechanical (MEM) mirror.

13. The device according to claim 10, wherein the reference records comprises a plurality of reference position parameters, and the reference position parameters are obtained by a setting process in which the object is disposed apart from the light source at a plurality of preset relative distances and the position of center of mass is calculated for each of a plurality of reference reflective light distributions formed by reflecting the plane light.

14. The device according to claim 10, further comprising a second sensor unit having a signal connection with the control unit, wherein the second sensor unit estimating the relative distance between the object and the light source according to a reflective light distribution, wherein the reflective light distribution is formed by the object reflecting the plane light.

15. The device according to claim 14, wherein the first sensor unit and the second sensor unit are disposed at each side of the light source.

16. The device according to claim 15, wherein the light source is adapted to generate a emergent ray used for forming the plane light, and distance on a vertical direction between the first sensor unit and a horizontal plane of the emergent ray is different from distance on the vertical direction between the second sensor unit and the horizontal plane of the emergent ray.

17. The device according to claim 15, further comprising an adjusting unit disposed between the first sensor unit and the second sensor unit for dynamically adjusting a horizontal distance between the first sensor unit and the second sensor unit.

18. The device according to claim 10, wherein the first sensor unit obtaining a first relative distance between the object and the light source at a first time point, obtaining a second relative distance between the object and the light source at a second time point, and obtaining movement of the object between the first time point and the second time point according to the first relative distance and the second relative distance.

19. The device according to claim 10, further comprising a transmission unit electrically connected to the sensing unit, the transmission unit being configured to transmit sensed images to a host having a signal connection to the device and to convert the relative distance between the object and the light source to a cursor display.

20. The device according to claim 10, wherein the plane light defines a sensing area on a real touch plane or on a stereoscopic operation plane.

21. A device for sensing a position of an object, comprising:
   a light source for generating a plane light;
   a first sensor unit disposed at one side of the light source, for estimating a relative distance between the object and the first sensor unit according to a reflective light distribution, wherein the reflective light distribution is formed by the object reflecting the plane light;
   a control unit having a signal connection with the first sensor unit, wherein the first sensor unit sensing a first image including the reflective light distribution, and a first position parameter being obtained according to a plurality of pixels corresponding to the reflective light distribution of the first image;
   a storage unit having a signal connection with the control unit, a reference record being provided to the control unit, wherein the control unit performs a calculation for a position of center of mass of the plurality of pixels and obtains the first position parameter, and estimates the relative distance between the object and the light source the first sensor unit according to the reference record and the first position parameter;
   wherein the calculation of the position of center of mass comprises using brightness of each pixel as weight of each pixel, the number of the plurality of pixels, and positions of the plurality of pixels on the first image.

22. The device according to claim 21, wherein the light source is a laser or a light-emitting diode (LED).

23. The device according to claim 21, wherein the light source emits an emergent ray, and the emergent ray generates the plane light by passing through a cylindrical lens or a micro-electromechanical (MEM) mirror.

24. The device according to claim 21, wherein the reference records comprises a plurality of reference position parameters, and the reference position parameters are obtained by a setting process in which the object is disposed apart from the first sensor unit at a plurality of preset relative distances and the position of center of mass is calculated for each of a plurality of reference reflective light distributions formed by reflecting the plane light.

25. The device according to claim 21, further comprising a second sensor unit having a signal connection with the control unit, the second sensor unit estimating the relative distance between the object and the second sensor unit according to a reflective light distribution, wherein the reflective light distribution is formed by the object reflecting the plane light.

26. The device according to claim 25, wherein the first sensor unit and the second sensor unit are disposed at each side of the light source.

27. The device according to claim 26, wherein the light source is adapted to generate a emergent ray used for forming the plane light, and distance on a vertical direction between the first sensor unit and a horizontal plane of the emergent ray is different from distance on the vertical direction between the second sensor unit and the horizontal plane of the emergent ray.

28. The device according to claim 26, further comprising an adjusting unit disposed between the first sensor unit and the second sensor unit for dramatically adjusting a horizontal distance between the first sensor unit and the second sensor unit.

29. The device according to claim 21, wherein the first sensor unit obtaining a first relative distance between the object and the first sensor unit at a first time point, obtaining a second relative distance between the object and the second sensor unit at a second time point, and obtaining movement of the object between the first time point and the second time point according to the first relative distance and the second relative distance.

30. The device according to claim 21, further comprising a transmission unit electrically connected to the sensing unit, the transmission unit being configured to transmit sensed images to a host having a signal connection to the device and to convert the relative distance between the object and the first sensor unit to a cursor display.

31. The device according to claim 21, wherein the plane light defines a sensing area on a real touch plane or on a stereoscopic operation plane.

* * * * *

UNITED STATES PATENT AND TRADEMARK OFFICE
CERTIFICATE OF CORRECTION

PATENT NO. : 9,012,828 B2  
APPLICATION NO. : 13/465403  
DATED : April 21, 2015  
INVENTOR(S) : Hung-Yu Lin and Chun-Jung Wu Page 1 of 1

It is certified that error appears in the above-identified patent and that said Letters Patent is hereby corrected as shown below:

In the Claims:

Col. 13, line 58 - Col. 14, line 1, "the object and the light source the first sensor" should read --the object and the first sensor--

Signed and Sealed this
Twenty-fourth Day of November, 2015

Michelle K. Lee
*Director of the United States Patent and Trademark Office*